(12) United States Patent
Schäfer et al.

(10) Patent No.: US 7,806,618 B2
(45) Date of Patent: Oct. 5, 2010

(54) FRICTIONAL ROTARY CONNECTION

(75) Inventors: Udo Schäfer, Witten (DE); Harry Oppenländer, Wetter (DE)

(73) Assignee: TAS Schafer GmbH, Wetter (DE)

( * ) Notice: Subject to any disclaimer, the term of this patent is extended or adjusted under 35 U.S.C. 154(b) by 470 days.

(21) Appl. No.: 11/281,318

(22) Filed: Nov. 16, 2005

(65) Prior Publication Data

US 2006/0140709 A1    Jun. 29, 2006

(30) Foreign Application Priority Data

Nov. 19, 2004    (EP) .................................. 04027593

(51) Int. Cl.
*F16D 11/00*    (2006.01)
*F16G 5/02*    (2006.01)
(52) U.S. Cl. .................... 403/31; 403/367; 403/374.1
(58) Field of Classification Search .................. 403/15, 403/31, 37, 365, 367, 368, 371, 374, 374.1
See application file for complete search history.

(56) References Cited

U.S. PATENT DOCUMENTS

| | | | |
|---|---|---|---|
| 2,764,437 A * | 9/1956 | Bratt | 403/15 |
| 4,425,050 A * | 1/1984 | Durand | 403/15 |
| 4,979,842 A * | 12/1990 | Miller et al. | 403/15 |
| 5,857,783 A | 1/1999 | Johansson et al. | |
| 5,947,626 A | 9/1999 | Miller et al. | |
| 6,231,262 B1 * | 5/2001 | Whitney | 403/31 |
| 6,874,387 B2 * | 4/2005 | Vaughn | 74/594.1 |
| 7,090,060 B1 * | 8/2006 | Whitney | 192/56.3 |

FOREIGN PATENT DOCUMENTS

DE    25 14 313    10/1976

OTHER PUBLICATIONS

Patent abstracts of Japan Bd. 018, Nr. 644 (M-1718), No. 06 249254 A.

* cited by examiner

*Primary Examiner*—Daniel P Stodola
*Assistant Examiner*—Nahid Amiri
(74) *Attorney, Agent, or Firm*—Bachman & LaPointe, P.C.

(57) ABSTRACT

In a frictional rotary connector having a tapered ring arrangement (3) to be placed onto a shaft and having at least one tapered ring section (e.g. 4a) with an inner surface for abutting the shaft, and with an oblique outer surface (e.g. 5a), at least one tensioning ring element (e.g. 6a) with an oblique inner surface, which element slides between a starting position and a clamping position on the oblique outer surface (e.g. 5a) of the tapered ring section (e.g. 4a), and a tensioning ring for moving the tensioning ring element (e.g. 6a) in order to lock the tensioning ring element (e.g. 6a) in the clamping position at least one retaining element (8) is provided which is arranged to be guided in a radial direction from a free position to a clamping position, wherein the retaining element (8) axially locks the tensioning ring element (e.g. 6a) in the clamping position.

8 Claims, 5 Drawing Sheets

FRICTIONAL ROTARY CONNECTION

BACKGROUND OF THE INVENTION

The present invention relates to rotary connection means acting by frictional engagement (also termed frictional revolving joint), such means having
- a hollow shaft to be slip-on attached onto a shaft, and a tapered ring arrangement, including a least one tapered ring section having an inner surface for close positioning in relation to the hollow shaft, and an oblique outer surface;
- at least one tensioning ring element having an oblique inner surface, which slides between a starting position and a tensioning or clamping position on the oblique outer surface of the tapered ring section; and
- tensioning means for moving the tensioning ring element into the tensioning position.

From DE 25 14 313 A1 a rotary connector acting by frictional engagement of the afore-mentioned type is known as a detachable shaft/hub-connection for interconnecting two shaft ends. The hollow shaft is designed as a ring comprising two shaft ends to be interconnected, on which ring there are arranged two pressure rings with oblique outer surfaces and two tensioning washers having an oblique inner surface, which, respectively, correspond to the afore-mentioned tensioning ring element, as well as a tensioning device serving as tensioning means and being comprised of tensioning bolts or screws and of sliding or link blocks being adjustable thereon. In order to interconnect the two shaft ends the tensioning bolts and the shaft/hub-connection are tightened. Consequently the link blocks slide outwardly on the tensioning bolts and, via the tensioning washers and the pressure rings, exert radial forces onto the ring and the shaft ends to be connected with the ring. The link blocks spread apart the tensioning washers in an axial direction starting from a starting position until the tensioning position has been reached, in which the shaft/hub-connector is firmly connected to the two shaft ends.

The link blocks in context with the tensioning bolts, are provided for retaining the tensioning washers in the tensioning position, with the link blocks preventing sliding back of the two tensioning washers from the tensioning position into the starting position. The link blocks and the tensioning bolts consequently form the tensioning means with which the tensioning washers are brought into the tensioning position to be held there in and thus to be retained.

It largely depends on the skill of the personal staff tightening the tensioning bolts whether or not the tensioning washers create sufficient radial forces for safe connection by frictional engagement between the ring and the two shaft ends. Attention has to be paid to the link blocks each transmitting adequately even forces onto the tensioning washers, respectively, in order to load the tensioning washers evenly over their inner circumferences. Due to the oblique contacting surfaces of the link blocks and the tensioning washers, upon tightening thereof, their biasing forces will permanently act in the direction of the starting position onto the link blocks as well as onto the tensioning bolts. Thus the biasing forces counteract the retention function of the tensioning washers in the tensioning position.

Rotary connection means based on load transmission produced by friction, of the type mentioned in the introductory portion of this description are also known from prior art by way of U.S. Pat. No. 5,947,626 for connecting a shaft with a hollow shaft. The device shown therein comprises a tapered ring arrangement to be pushed onto the hollow shaft. This arrangement includes two tapered ring sections and has oblique outer surfaces which decline toward the centre when seen in the cross section of the tapered ring arrangement. There are two tensioning ring elements arranged on the oblique outer surfaces of the tapered ring arrangement and having oblique inner surfaces adapted correspondingly to the oblique outer surfaces of the tapered ring arrangement. Thereby, the tensioning ring elements are capable of sliding on the tapered ring arrangement. By applying hydraulic pressure onto a hydraulic port formed in a tensioning ring a pressure ring chamber is created between the tensioning ring elements. On its outer side, the pressure ring chamber is restricted by a ring collar of a tensioning ring element. On its inner side the pressure ring chamber is restricted by an intermediate ring element. At the ring collar and the intermediate ring element the pressure ring chamber is sealed by annular sealing means in each position of the tensioning ring elements.

By applying hydraulic pressure to the pressure ring chamber the tensioning ring elements are spaced apart and made to reach a tensioning position in which the tensioning ring elements exert pressure via the inclined surfaces of the tapered ring arrangement onto the hollow shaft thus to create rotary connection by frictional engagement between the hollow shaft and the shaft.

In order not to have to maintain hydraulic pressure permanently during operation there is provided mechanical securing or retention of the tensioning ring elements in their tensioning position. To this end, fastening bolts or screws are arranged laterally along the circumference of the tensioning ring elements.

A further type of rotary connection by frictional engagement is disclosed by DE 43 32 477. In contrast to the device mentioned in the introductory portion this apparatus shows a stationary bearing ring besides two tensioning ring elements. In this case a pressure ring chamber is formed between the bearing ring and the tensioning ring element arranged at the side thereof.

The known devices are essentially disadvantageous in that the assembly thereof is very complex, because, for securing the tensioning ring elements in the tensioning position, tightening of the fastening bolts becomes necessary. On the other hand, for releasing the friction-engagement connection the fastening screws have to be loosened in first place. A further disadvantage is that due to the maximum stability and the maximum number of bolts along the circumference of the tensioning ring elements maximum load transmission is predetermined. Thus the torque of the rotary connection to be transmitted at the maximum is predetermined. Particularly, in the case of applying a rotary connection of frictional engagement in modern wind energy plants, the maximum torque of the connection presently to be achieved does not suffice.

SUMMARY OF THE INVENTION

It is therefore the task of the present invention to provide rotary connecting means of frictional engagement of the type mentioned in the introductory portion of this specification, which enable high torque to be transmitted by the connection and, at the same time, simplified assembling.

According to the invention this task is achieved in that in rotary connecting means of the frictional engagement type a separate retaining element for securing the tensioning ring element in its tensioning position is provided in addition to the tensioning means, which retaining element can be guided in a radial direction independent of the tensioning means from a free position into a clamping position in which the retaining element axially arrests the tensioning ring element.

This brings about the advantage of a highly simple structure and a short path between the free position and the clamping position of the retaining element. Furthermore the radial direction is preferably perpendicular with respect to the moving direction of the tensioning ring elements. Thus, it is avoided that the forces acting on the retaining element from the tensioning ring element effect a movement of the retaining element from the clamping position, whereby any non-intended release of the locking of the tensioning ring element is prevented. The tensioning ring element, however, should be designed such that activating of the retaining element from the free position into the clamping position can be achieved easily. For example the tensioning ring element may have a suitable recess serving for receiving the retaining element in the free position and providing suitable guides for the movement of the retaining element.

The arrangement can be designed simply, i.e. by way of only one tapered ring and one tensioning ring element. These can be arranged axially on the hollow shaft and at the side of an axially fixed bearing ring. However, one may prefer an arrangement with two tapered or wedge ring elements and two tensioning ring elements with the retaining element being arranged between the tensioning ring elements in the clamping position. Regarding the free position of the retaining element it is particularly advantageous that the recess may be arranged centrally between the tensioning ring elements.

The free movement of the retaining element into the clamping position is at least possible in the tensioning position of the tensioning ring elements. The tensioning means are used in order to reach the tensioning position of the tensioning elements. Preferably, these are formed as hydraulic pressure means, and in a particularly preferred manner they may comprise a pressure ring chamber including a hydraulic port. For tightening, a previously determined pressure is applied via the hydraulic connection or port onto the pressure ring chamber, whereby the tensioning ring elements may slide apart axially on the wedge/tapered ring arrangement. Herein, the pressure ring chamber may be formed directly between the tensioning ring elements and thus have effect directly on both tensioning ring elements. However they can also indirectly exert pressure onto at least one tensioning ring element, for example by arrangement between a tensioning ring element and an adjacent bearing ring being stationary in the axial direction. After the retaining element has reached the clamping position, the retaining element prevents unintended sliding back of the tensioning elements into the starting position. The retaining element may, herein, be arranged directly between tensioning ring elements, but they may also effect an indirect clamping or wedging of the tensioning ring elements. To this end, clamping ring elements with annularly shaped oblique surfaces being conical with regard to their circumferences may be used to serve as retaining elements, which surfaces can be pushed from the free position into the clamping position by relative movement of the clamping ring elements in the circumferential direction. By the thus caused change of the mutual axial of the tensioning ring elements an arresting of the tensioning ring elements is made possible.

The retaining element should be designed such that it is able to withstand the mechanical load in the clamping position as well as during operation. Preferably the retaining element has optimally large engagement surfaces with regard to the tensioning ring elements. These should furthermore preferably be uniformly distributed over the circumference of the rotary connection in order to achieve uniform pressure/load distribution by frictional engagement onto the retaining elements in the tightening position of the rotary connection. Moreover the retaining element is preferably made from high-strength steel.

According to a convenient embodiment of the invention the retaining element is formed in the shape of a segment. With particular preference the retaining element may be formed in the shape of a segment in the plane normal to the axle of the shaft.

Preferably, three retaining elements are arranged along a circumferential line of the tapered or wedge ring arrangement. This results in advantages regarding the distribution of pressure and load within the rotary frictional connection when the retaining elements are in the clamping position. In the case of a uniformly spaced arrangement of the three retaining elements along the circumference of the tapered ring arrangement it is possible to avoid tilting of the tensioning ring elements. Appropriately, the retaining elements essentially completely enclose the circumference of the tapered ring arrangement, in particular in the case of segment shaping of the retaining elements. This advantageously brings about a large-area engagement of the retaining elements with the tensioning ring elements.

According to a further embodiment of the invention an annular or ring piston may be arranged in the pressure ring chamber, which piston forms a receptacle for the retaining element in the free position, and a guide for the movement. The ring piston may be arranged in the pressure ring chamber such that sufficient pressure can be built-up in the pressure ring chamber. In particular, the ring piston may be designed such that the hydraulic connection of the pressure ring chamber is not obstructed.

In the free position within the ring piston the receptacle for the retaining element may be positioned in the pressure ring chamber. However, it should be designed such that the retaining element will not come into contact with the pressure medium such as hydraulic oil in any position. The receptacle should, furthermore, be designed such that the retaining elements can reach the clamping position easily as soon as the retaining elements are in the tensioning position. The guide on the annular piston should be constructed such that the retaining element cannot block in any position.

It is furthermore preferred that the ring piston should have recesses for ring seals sealing the pressure ring chamber with regard to the shaft, the retaining element and the surroundings. The recesses should be structured such that the ring seals will seal the pressure ring chamber in any position of the tensioning ring elements such that no pressure medium will exit from the pressure ring chamber. In the particular, contamination at the oblique outer surfaces of the tapered ring arrangement should be avoided. The free movement of the tensioning ring elements and of the retaining element should not be affected by the recesses of the annular seals. Preferably, the annular seals may be O-ring seals.

Expediently the retaining element has at least one control rod which extends outwardly from the pressure ring chamber through an opening of the ring piston and separated with respect to fluid. By such an arrangement it is possible to operate the retaining element from the outside. The opening within the ring piston should include a sufficient and thus appropriate guide for the control rod. Is this possible to achieve sealing with regard to the pressure ring chamber e.g. by an annular seal; however, one may basically also think of another structural solutions. If several retaining elements are applied within a rotary connection of frictional engagement it is preferred that a control rod is arranged on each retaining element and extends to the outside through one opening each in the ring piston.

Preferably, at least one spring element may cooperate with the retaining element such that the movement into the clamping position is supported by force. As soon as the tensioning ring elements have reached the tension position from their starting position the spring element effects an independent movement of the retaining element into the clamping position whereby self-locking of the rotary connection is obtained in an advantageous manner.

Expediently, the inclination of the oblique outer surfaces of the tapered ring sections is selected such that the angle enclosed with regard to the central axle of the shaft is larger than 5°, preferably 7° to 10°. In this angle range sufficient load transmission onto the hollow shaft and the shaft in the tensioning position of the tension ring elements is obtained whilst achieving compact structure of the rotary frictional connector.

BRIEF DESCRIPTION OF THE DRAWINGS

Examples of embodying the invention are being shown in the accompanying drawings and are explained in greater detail in the following. In the drawings.

DETAILED DESCRIPTION

Figure 1:
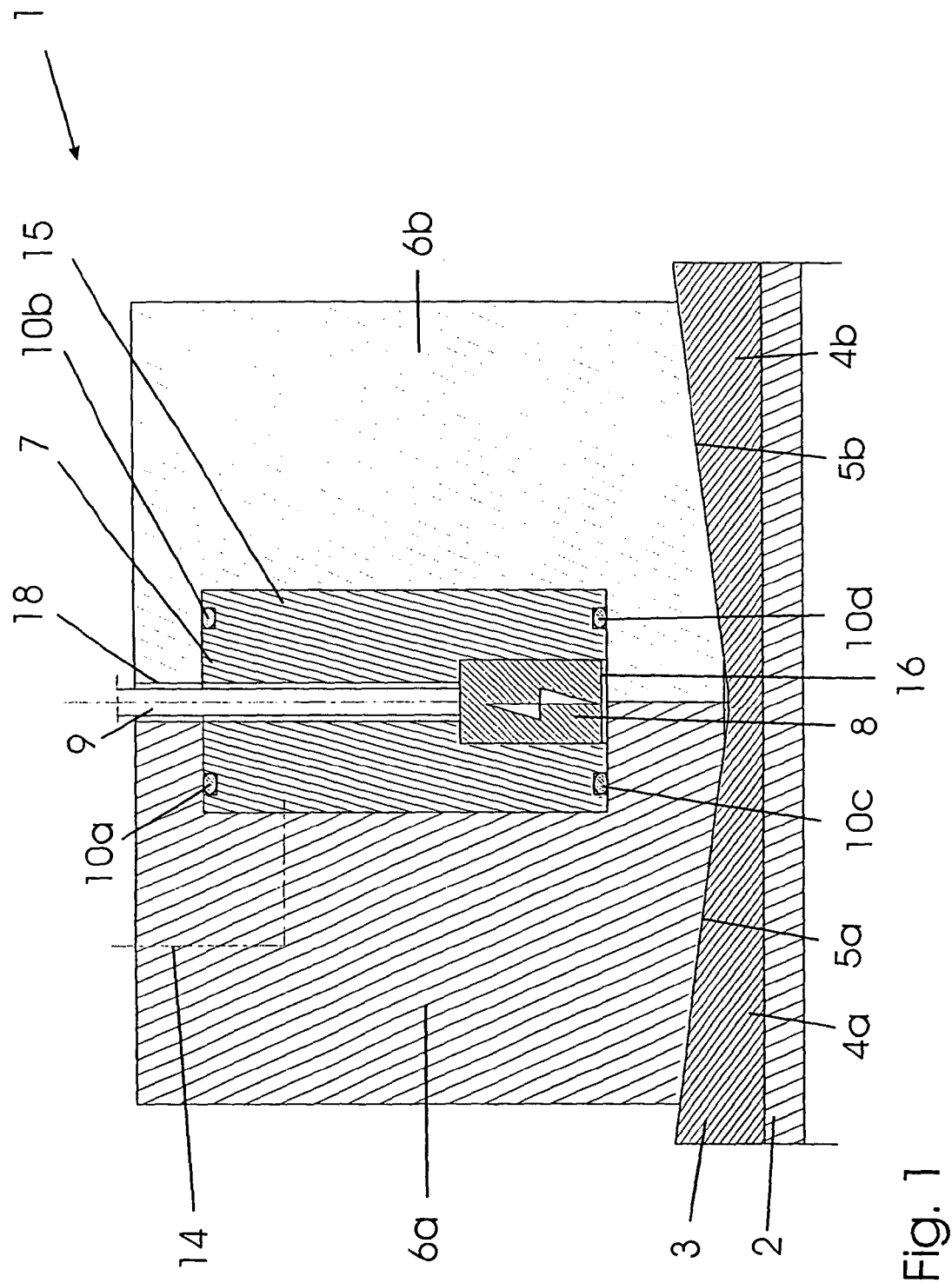
FIG. 1 shows a sectional representation of a rotary connection means in the starting position along line B-B.

With regard to its function, a rotary connection means 1 acting by frictional engagement (also termed "rotary frictional connector" herein) essentially consists of a tapered ring arrangement 3 and two tensioning ring elements 6a and 6b. The tapered ring arrangement 3 consists of two merging tapered ring sections 4a and 4b. The essentially smooth inner surface of the tapered ring arrangement 3 forms the contact with regard to a hollow shaft 2. A shaft is arranged within the hollow shaft. Both shafts may be interconnected by means of the rotary frictional connector 1 in a manner of frictional engagement which may be separated, as explained in the following. Two tensioning ring elements 6a, 6b are arranged in a manner to be able to slide on the outer surfaces 5a, 5b of the tapered ring sections 4a, 4b. The inclination of the inner surfaces of the tensioning ring elements 6a, 6b facing towards the axle's centre essentially correspond to the inclination of the oblique outer surfaces 5a, 5b of the tapered ring sections 4a and 4b, respectively. A pressure ring chamber 15 is formed by a centrally arranged ring-shaped recess within the tensioning ring elements 6a, 6b. The pressure ring chamber 15 may be pressurized by a hydraulic port 14 using an appropriate pressure medium such as hydraulic oil in order to cause a change in position, namely an axial displacement of the tensioning ring elements 6a, 6b.

A ring or annular piston 7 is arranged within the pressure ring chamber 15. The ring piston 7 is construed such that building-up and releasing of the pressure within the pressure ring chamber 15 via the hydraulic port 14 is not impaired. The ring piston 7 essentially serves for receiving the retaining elements 8 and for sealing the pressure ring chamber with regard to the shaft, the surroundings and the retaining elements 8. To this end the ring piston 7 has recesses 10a-10d in which annular seals are arranged. The recesses 10a-10d are arranged on the ring piston 7 such that sealing of the pressure ring chamber can be obtained in any possible position of the tensioning ring elements 6a and 6b. Furthermore, the ring piston 7 has radial bores 18 via which rods 9 extend outwardly from the retaining element 8. From a free position, in which the retaining elements 8 are within a receptacle 16 in the ring piston 7, they can be moved into a tensioning or clamping position between the tensioning ring elements 6a, 6b by activating the rods 9.

Three retaining or fastening pins or bolts 11 per tensioning ring element 6a, 6b are laterally attached to these elements by screws 12. The retaining bolts 11 axially extend through bores in the tensioning ring elements 6a, 6b and within the ring piston 7. On the side of the ring piston 7 opposite each of the screws 12 of the retaining bolts 11 there is arranged a locking means 13 on the retaining bolts 11. The locking means 13 predetermines maximum spreading of the tensioning ring elements 6a, 6b.

FIG. 1 is a sectional representation of a rotary connection along section line B-B. In FIG. 1 the tensioning ring elements 6a, 6b are shown in a starting position in which there is no or only little pressure within the pressure ring chamber 15. The retaining elements 8 are in the free position in the receptacle 16 within the ring piston 7. In this position, the rotary connector 1 can be pushed onto the hollow shaft 2. In this state, the hollow shaft 2 is not frictionally connected to the shaft arranged within in the hollow shaft.

Figure 2:
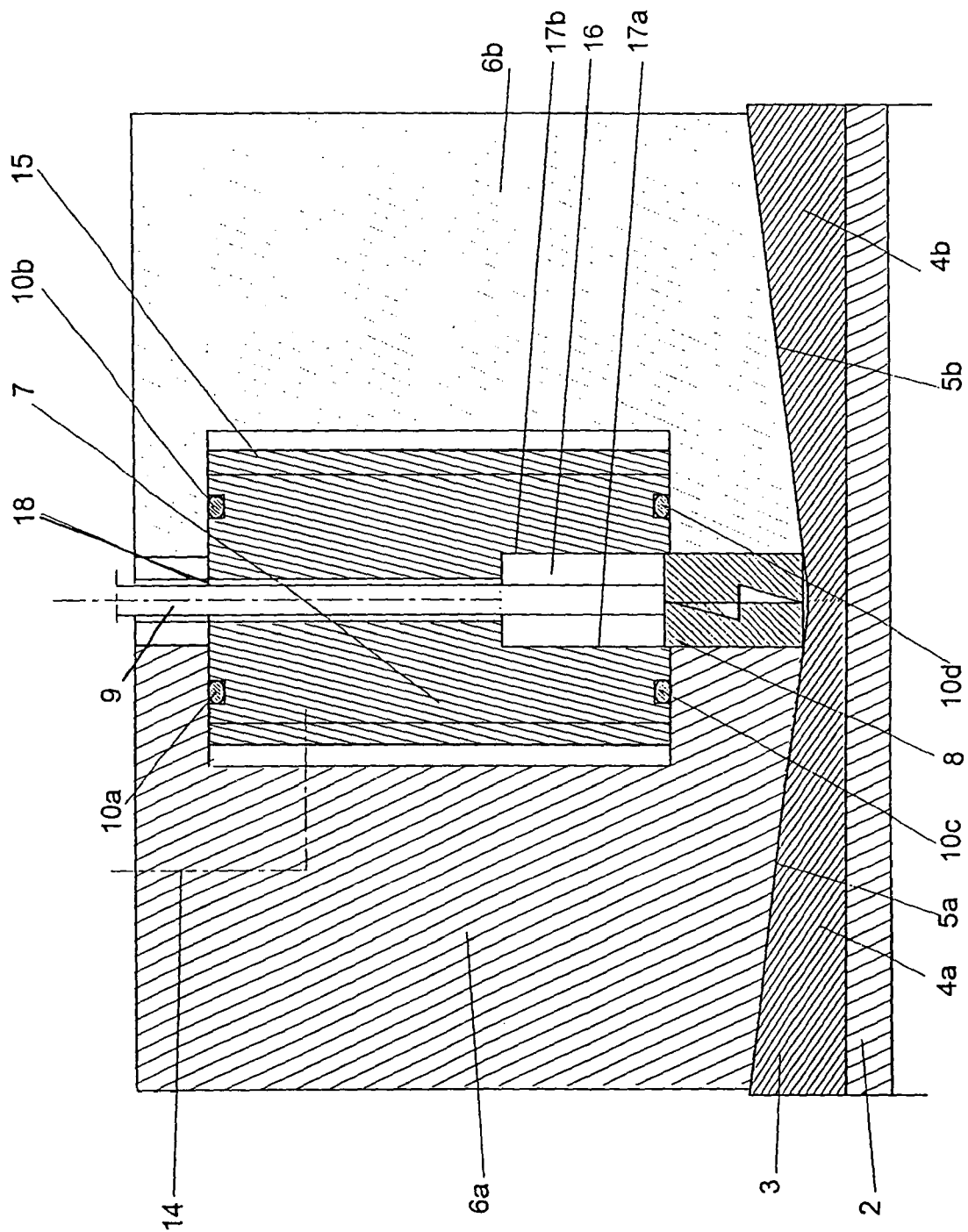
FIG. 2 shows a sectional representation of a rotary connection means in the tension position along line B-B.
Figure 3:
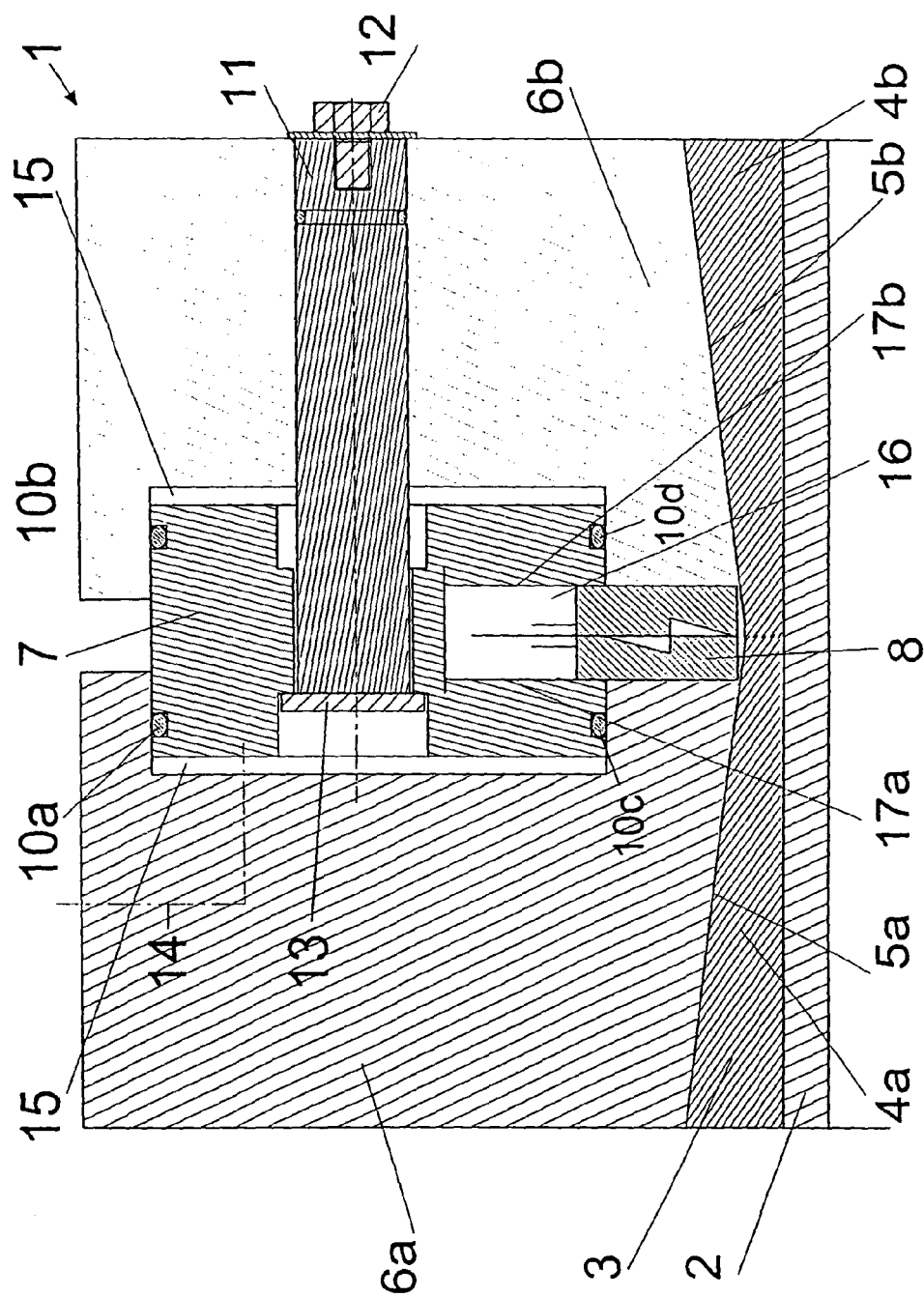
FIG. 3 shows a sectional representation of a rotary connection means in the tension position along line A-A.

By applying appropriate pressure to the pressure ring chamber 15 via the hydraulic port 14 the tensioning ring elements 6a, 6b slide apart on the oblique outer surfaces 5a, 5b of the tapered ring sections 4a, 4b and reach a tensioning position which is shown in FIG. 2 in sectional representation along section line B-B. In the tensioning position the tensioning ring elements 6a, 6b exert defined pressure onto the tapered ring arrangement 3 and thus onto the hollow shaft 2. Hereby, the hollow shaft 2 is connected to the shaft by frictional engagement. In this position, the fastening bolts 11 prevent further spreading of the tensioning ring elements 6a and 6b as is being shown in FIG. 3.

By activating the rods 9 the retaining elements 8 are brought from their free position within the receptacle 16 into the clamping position between the two tensioning ring elements 6a, 6b. This state is shown in FIG. 2. The retaining elements 8 secure the axial position of the tensioning ring elements 6a, 6b in the clamping position against axial displacement and against any sliding-back of the tensioning ring elements 6a, 6b into the starting position after the hydraulic pressure within the pressure ring chamber 15 has been released. The frictional connection between the hollow shaft 2 and the shaft therein may now be maintained without hydraulic pressure.

In order to release the frictional connection between the hollow shaft 2 and the shaft it is again necessary to build-up hydraulic pressure in the pressure ring chamber 15 via the hydraulic port 14 so that clamping between the retaining elements and the tensioning ring elements is released. By again activating the rods 9 the retaining elements 8 are withdrawn from the clamping position into the free position within the receptacle 16 in the ring piston 7. On releasing the hydraulic pressure in the pressure ring chamber 15 the tensioning ring elements 6a and 6b will slide back into their starting position due to the forces generated via the oblique outer surfaces 5a, 5b of the tapered ring sections 4a, 4b. Hereby the frictional connection between the hollow shaft 2 and the shaft arranged therein is released.

Figure 4:
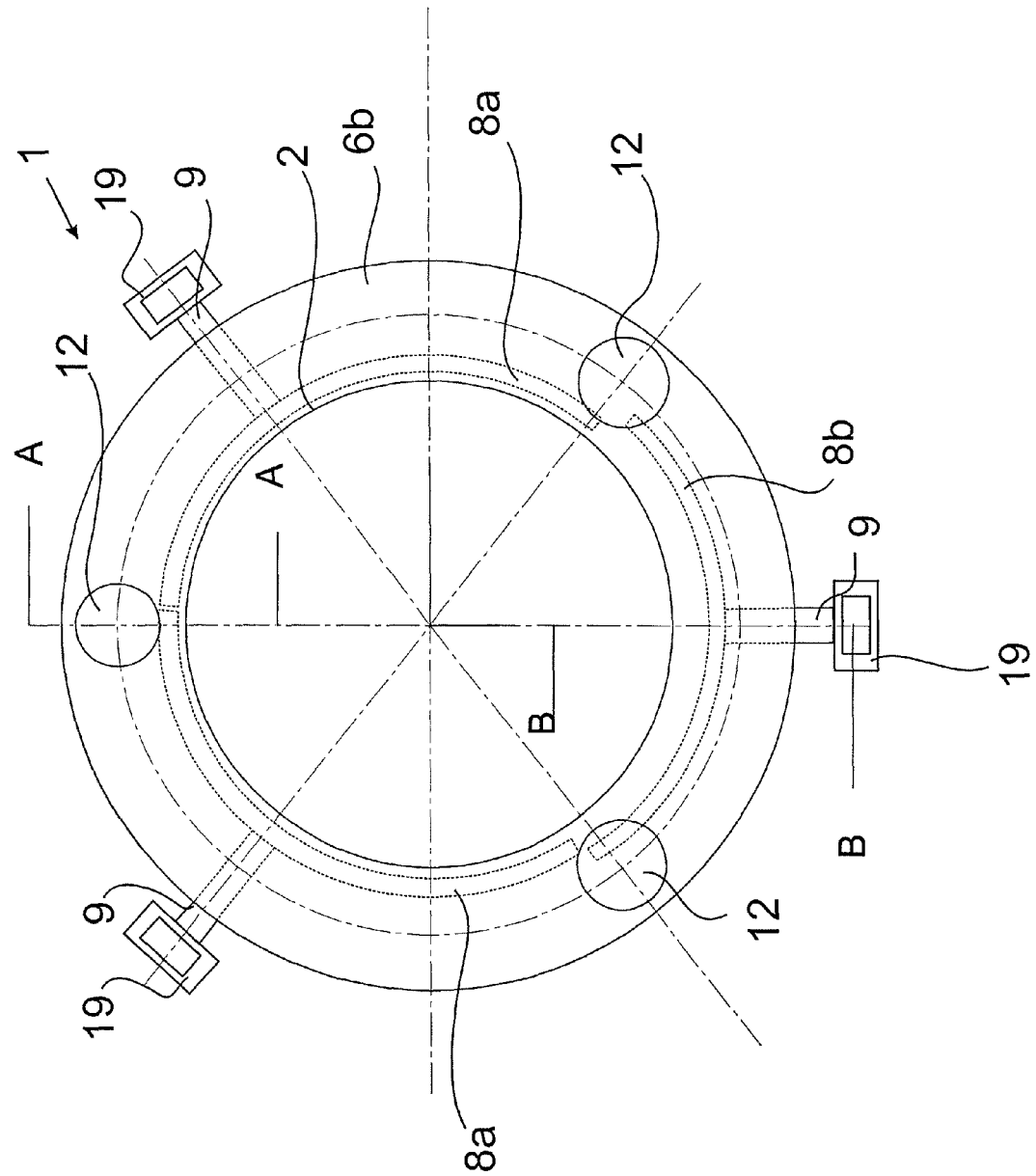
FIG. 4 shows a schematic top view of a rotary connection means along the axle of the shaft.
Figure 5:
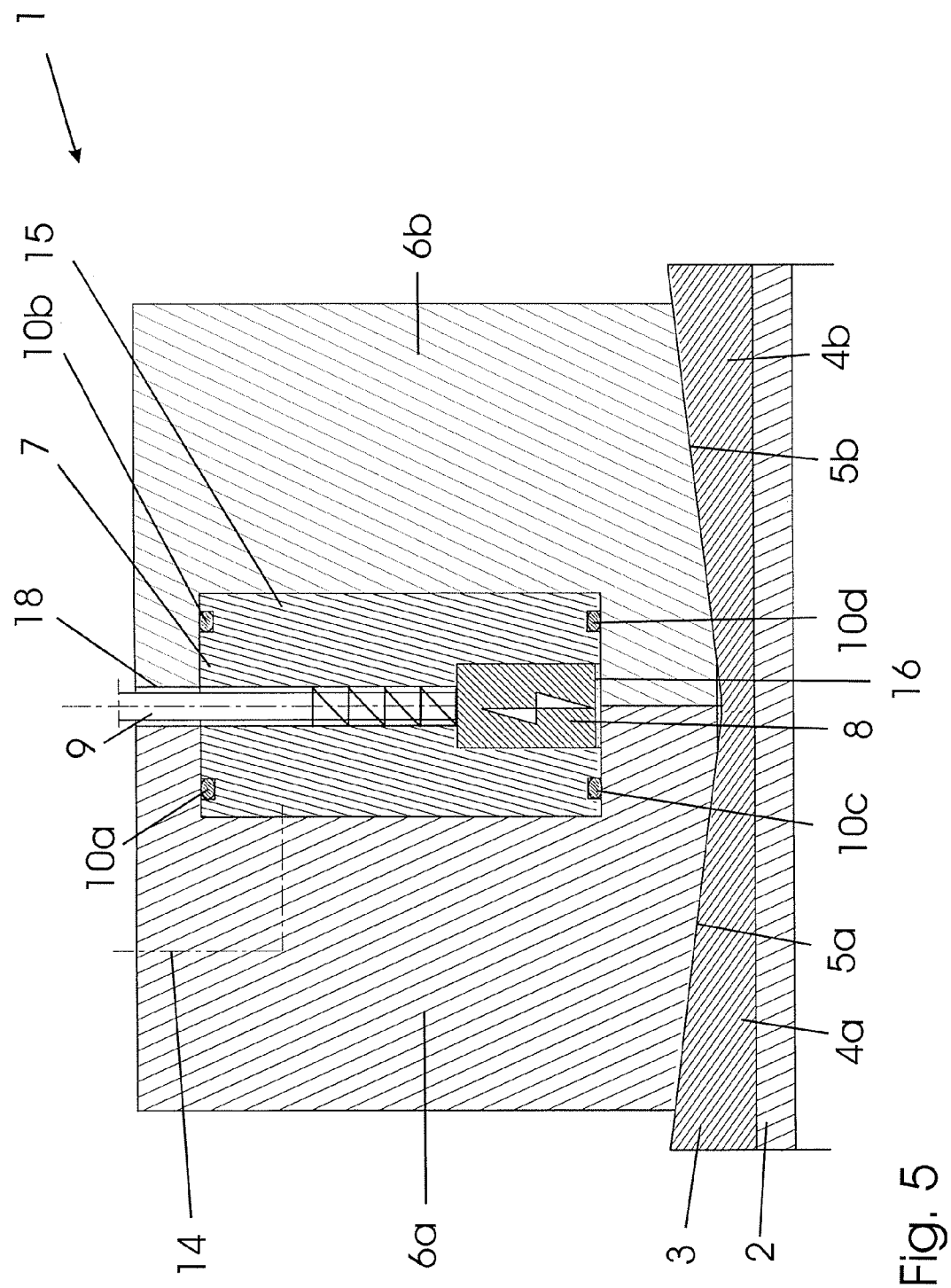
FIG. 5 shows a schematic view similar to FIG. 1 including an additional spring element.

FIG. 4 shows a schematic top view of the rotary connector 1 along the axle of the shaft. The screws 12 of the fastening bolts 11 are arranged at constant spacing along a circumferential line on the tensioning ring elements 6a, 6b. On their ends extending from the ring piston 7, the rods 9 have operating handles 19. The segment-type shaped retaining elements 8 almost completely enclose the circumference of the hollow shaft 2. Thus the pressure of the tensioning ring elements 6a, 6b exerted onto the retaining elements 8 is distributed onto relatively large lateral surfaces of the retaining elements 8. Both retaining elements 8a are shown in the clamping position, while the retaining element 8b is in its free position. Preferably, at least one spring element (FIG. 5, shown on rod 9) may cooperate with the retaining element such that the movement into the clamping position is supported by force.

It should be noted that the drawings are not to be understood to be restricted according to the scale used therein.

What is claimed is:

1. A rotary connecting means based on frictional engagement, comprising:
    a hollow shaft (2) to be placed on a shaft, and a tapered ring (3) placed on the hollow shaft (2) and including at least one tapered ring section (4a) having an inner surface abutting the hollow shaft (2), and having an oblique outer surface (5a);
    at least one tensioning ring element (6a) placed on the tapered ring (3) and having an oblique inner surface, wherein the tensioning ring element (6a) slides between a starting position and a tensioning position along the oblique outer surface (5a) of the tapered ring section (4a); and
    tensioning means comprising a pressure ring chamber (15) and an annular piston (7) within the pressure chamber (15) for moving the tensioning ring element (6a) into the tensioning position, wherein:
    in addition to the tensioning means there is provided at least one separate retaining element (8) for securing the tensioning ring element (6a) in the tensioning position, which retaining element (8) is arranged to move and be guided in a radial direction with respect to the hollow shaft (2), independent of the tensioning means, from a free position into a clamping position in which the retaining element (8) axially blocks the tensioning ring element (6a) in the tensioning position, wherein the piston (7) defines a receptacle (16) for the retaining element (8) in the free position and a guide (17a, 17b) for the retaining element (8) during movement of the retaining element (8).

2. The rotary connecting means based on frictional engagement, as claimed in claim 1, characterized in that the retaining element (8) is designed in segment shape.

3. The rotary connecting means based on frictional engagement, as claimed in claim 1, characterized in that the at least one tensioning ring element (6a) comprises two tensioning elements (6a, 6b), and in that three retaining elements (8a, 8b) are arranged along circumferential lines of the tensioning ring elements (6a, 6b).

4. The rotary connecting means based on frictional engagement, as claimed in claim 1, characterized in that the annular piston (7) has recesses (10a-10d) for annular seals which seal pressure ring chamber (15) with regard to the shaft, the retaining element (8) and the surroundings.

5. The rotary connecting means based on frictional engagement, as claimed in claim 1, characterized in that the retaining element (8) has at least one control rod extending through an opening within the annular piston (7) outwardly from the pressure ring chamber (15), and wherein the control rod is sealed against fluid flow in the opening.

6. The rotary connecting means based on frictional engagement, as claimed in 1, characterized in that spring elements are arranged in the ring piston (7) which cooperate with the retaining element (8) in such manner that the movement into the clamping position is supported by force.

7. The rotary connecting means based on frictional engagement, as claimed in 1, characterized in that the inclination of the oblique outer surface (5a) of the tapered ring section (4a) is such that its angle with regard to the central axle of the shaft is larger than 5°.

8. The rotary connecting means based on frictional engagement, as claimed in 1, characterized in that the inclination of the oblique outer surface (5a) of the tapered ring section (4a) is such that its angle with regard to the central axle of the shaft is 7° to 10°.

* * * * *